United States Patent
Kolde et al.

(10) Patent No.: US 6,559,866 B2
(45) Date of Patent: May 6, 2003

(54) SYSTEM AND METHOD FOR PROVIDING FOREIGN LANGUAGE SUPPORT FOR A REMOTE CONTROL DEVICE

(75) Inventors: Hubert E. Kolde, Mercer Island, WA (US); Kory D. Christensen, Kaysville, UT (US); David J. McKenzie, West Valley City, UT (US)

(73) Assignee: Digeo, Inc., Kirkland, WA (US)

( * ) Notice: Subject to any disclaimer, the term of this patent is extended or adjusted under 35 U.S.C. 154(b) by 73 days.

(21) Appl. No.: 09/863,895

(22) Filed: May 23, 2001

(65) Prior Publication Data

US 2002/0175930 A1 Nov. 28, 2002

(51) Int. Cl.⁷ .............................. G06F 3/00; H04N 5/44
(52) U.S. Cl. ...................... 345/765; 345/703; 345/866; 348/734; 704/8
(58) Field of Search .................................. 345/473, 589, 345/619, 660, 666, 703, 709, 716, 744, 747, 765, 810, 815, 821, 822, 835, 840, 841, 853, 854, 859, 860, 866; 704/8; 707/536; 725/131, 135, 139

(56) References Cited

U.S. PATENT DOCUMENTS

| | | | | |
|---|---|---|---|---|
| 5,280,572 A | | 1/1994 | Case et al. ................... | 395/144 |
| 5,648,824 A | * | 7/1997 | Dunn et al. ................. | 348/563 |
| 5,818,440 A | | 10/1998 | Allibhoy et al. ............ | 345/327 |
| 5,880,768 A | | 3/1999 | Lemmons et al. ............. | 348/1 |
| 6,064,385 A | | 5/2000 | Sturgeon et al. ............ | 345/353 |
| 6,111,572 A | * | 8/2000 | Blair et al. ................. | 345/703 |
| 6,141,002 A | | 10/2000 | Kanungo et al. ........... | 345/327 |
| 6,240,555 B1 | | 5/2001 | Shoff et al. ................. | 725/110 |
| 6,452,640 B1 | * | 9/2002 | Yuen et al. ................. | 348/460 |

\* cited by examiner

*Primary Examiner*—Raymond J. Bayerl
*Assistant Examiner*—X. L. Bautista
(74) *Attorney, Agent, or Firm*—Kory D. Christensen; Stoel Rives LLP (57) ABSTRACT

In response to an interactive option becoming available, an icon sharing visual characteristics with a corresponding button of a remote control is displayed. A description of the interactive option in the language of the user may also be presented visually or audibly. The icon and description may be displayed alone or in a configuration of a map of the remote control. The description may be audibly output using voice synthesis techniques.

48 Claims, 9 Drawing Sheets

SYSTEM AND METHOD FOR PROVIDING FOREIGN LANGUAGE SUPPORT FOR A REMOTE CONTROL DEVICE

BACKGROUND OF THE INVENTION

1. Field of the Invention

The present invention relates generally to the field of interactive television systems. More specifically, the present invention relates to a system and method for providing foreign language support for a remote control device within an interactive television system.

2. Description of Related Background Art

Television and Internet technologies are beginning to converge. In particular, access to the World Wide Web via Internet-enabled television systems is becoming increasingly popular. Internet-enabled television systems, also referred to as interactive television systems, enable users to enjoy a robust set of interactive options not available in conventional televisions. Internet-enabled television systems bring the power of the Internet to a large segment of customers who were previously deterred by the complexities of modern personal computers.

The Internet spans many countries and languages. Thus, interactive television systems should provide support for multiple languages. While software may be easily written to accommodate many different languages, it is more difficult for hardware components, such as remote controls, to be similarly configured. Typically, each remote control includes printed text in a single language. Thus, a speaker of one language is often required to operate a remote control designed for a speaker of another language.

For instance, an individual may be using an interactive television system at a hotel in a foreign country. Such an individual may be hindered by the fact that the buttons of the remote control include text in a foreign language. Likewise, public kiosks incorporating interactive television systems need to support multiple languages, but are typically configured for only one language or a limited subset of languages. Even in the home, there may be individuals who speak different languages, but need to share a common interactive television system.

Conventional solutions, such as applying language-specific stickers to a remote control, are deficient in a number of respects. For example, such stickers may be easily separated from the remote control. In addition, the stickers do not easily accommodate interactive television systems that are frequently used by speakers of multiple different languages, as in the case of a hotel, a public kiosk, or in a multi-lingual home. Continually changing stickers or providing different remote controls for each language is impractical and costly.

Accordingly, what is needed is a system and method for assisting a speaker of a first language in operating a remote control device designed for a speaker of a second language.

BRIEF DESCRIPTION OF THE DRAWINGS

Non-exhaustive embodiments of the invention are described with reference to the figures, in which.

DETAILED DESCRIPTION OF THE PREFERRED EMBODIMENTS

The present invention solves the foregoing problems and disadvantages with a system and method for assisting a speaker of a first language in operating a remote control device designed for a speaker of a second language. In one implementation, an icon representing each of a number of interactive options periodically available within an interactive television system is stored within an icon repository. Each interactive option corresponds to a button on a remote control device, and each icon shares a common visual characteristic with a corresponding button on the remote control device. Examples of shared visual characteristics include shape, color, text markings, graphical markings, as well as a combination of these.

In addition, descriptions, in various languages, of the interactive options are stored in language modules. When an interactive option becomes available, a corresponding icon is displayed on a display device for the interactive television system. In addition, the corresponding description, in a user-selected language, is presented. The description may be presented visually (e.g., on the television) or audibly (e.g., using voice synthesis).

As used herein, the term "remote control" is not limited to conventional remote controls. Rather, the term contemplates a variety of devices that enable a user to operate an interactive television system. Remote controls may include, for example, webpads, cell phones, personal digital assistants (PDAs), wired or wireless keyboards, and the like.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, user selections, network transactions, database queries, database structures, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Throughout the following disclosure, the term "coupled" may be used to refer to components that are either directly connected or are linked by one or more other components. Thus, as used herein, the term "coupled" may be synonymous with "in electrical communication with" or simply "in communication with."

Figure 1:
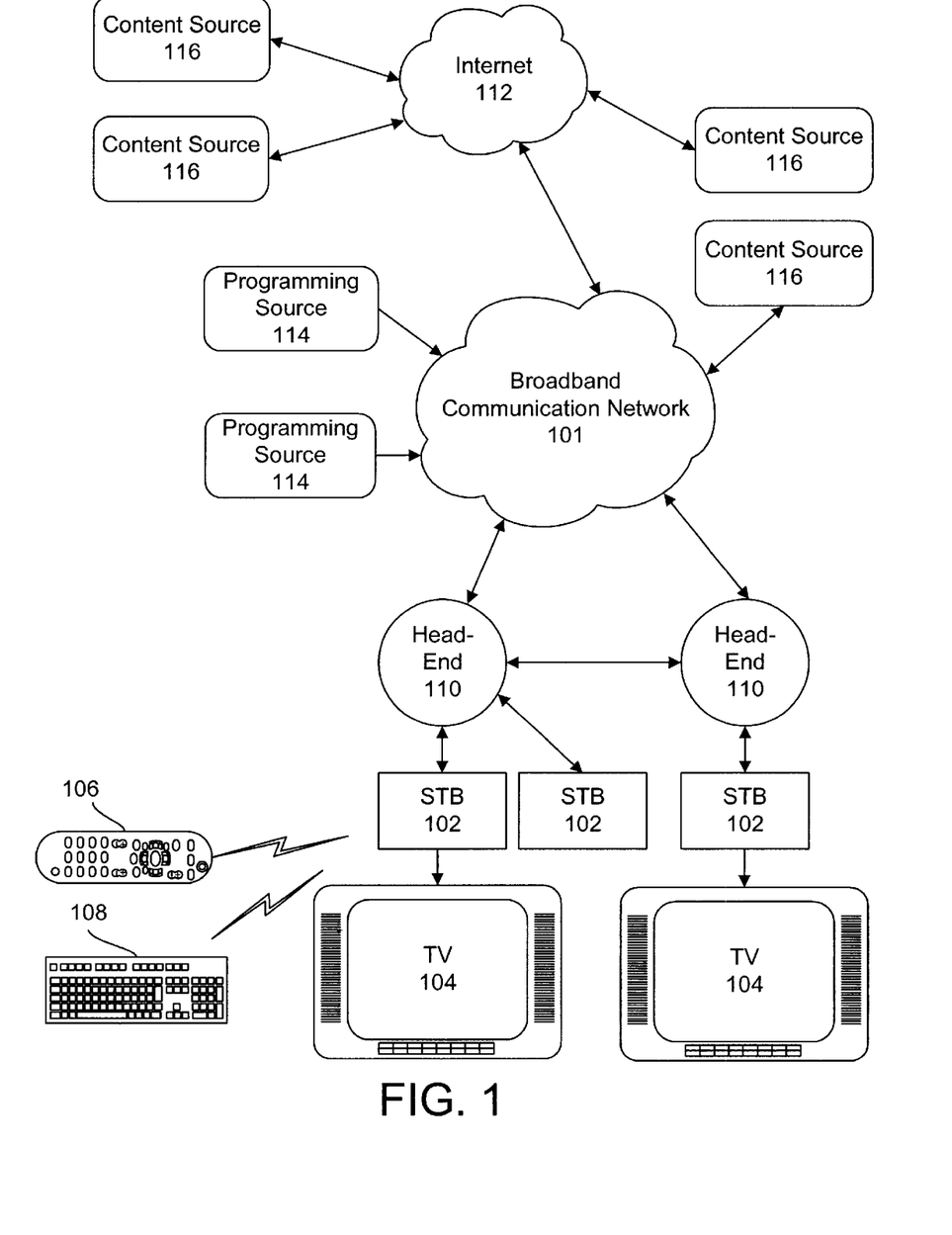
FIG. 1 is a block diagram of a system for delivering television programs and other forms of content.

Referring now to FIG. 1, there is shown a system 100 for delivering television programs and other forms of content to a plurality of customers. In one implementation, the system 100 includes a broadband communication network 101, such as a cable network. However, other networks are contemplated, one particular example of which is a satellite network.

In one configuration, the system 100 includes a plurality of set top boxes (STBs) 102 located, for instance, at customer homes. Generally, an STB 102 is a consumer electronics device that serves as a gateway between a customer's television 104 and the network 101. In alternative embodiments, an STB 102 may be embodied more generally as a personal computer, a television 104 with integrated STB functionality, or another type of client terminal.

An STB 102 receives encoded television signals and other information from the network 101 and decodes the same for display on the television 104 or other display device (such as a computer monitor, flat panel display, or the like). As its name implies, an STB 102 is typically located on top of, or in close proximity to, the television 104.

Each STB 102 may be distinguished from other network components by a unique identifier, number, code, or address, examples of which include an IP (Internet Protocol) address or media access control (MAC) address. Thus, video streams and other information may be transmitted from the network 101 to a specific STB 102 by specifying the corresponding address, after which the network 101 routes the transmission to its destination using conventional techniques.

A remote control 106 is provided, in one configuration, for convenient remote operation of the STB 102 and the television 104. The remote control 106 may use infrared (IR), radio frequency (RF), or other wireless technologies to transmit control signals to the STB 102 and the television 104. Other remote control devices are also contemplated, such as a wired or wireless mouse (not shown).

Additionally, a keyboard 108 (either wireless or wired) is provided, in one embodiment, to allow the customer to rapidly enter text information into the STB 102. Such text information may be used for e-mail or instant messaging, e.g. text-based chat. In various embodiments, the keyboard 108 may use infrared (IR), radio frequency (RF), or other wireless technologies to transmit keystrokes to the STB 102.

In one embodiment, each STB 102 is coupled to the network 101 via a head-end 110 or other distribution center. In the context of a cable network, a head-end 110 is generally a centrally-located facility where television programs are received from a local cable TV (CATV) satellite downlink or other source and packaged together for transmission to customer homes. In one configuration, a head-end 110 also functions as a Central Office (CO) in the telephone industry, routing video streams and other data to and from the various STBs 102 serviced thereby. Head-ends 110 may be coupled directly to one another or through the network 101. In some cases, head-ends 110 may be connected via a separate network, one particular example of which is the Internet 112.

The network 101 is preferably coupled to one or more television programming sources 114, which provide television programming for distribution to the STBs 102. In one configuration, television programs are distributed in an encoded format, such as MPEG (Moving Picture Experts Group). Various MPEG standards are known, such as MPEG-2, MPEG-4, MPEG-7, and the like. Thus, the term "MPEG," as used herein, contemplates all MPEG standards. Moreover, other video encoding/compression standards exist other than MPEG, such as JPEG, JPEG-LS, H.261, and H.263. Accordingly, the invention should not be construed as being limited only to MPEG.

The network 101 is also preferably coupled to the Internet 112 to provide access thereto by the STBs 102. The Internet 112 is a "network of networks" and is well known to those skilled in the art. Communication over the Internet 112 is accomplished using standard protocols, such as TCP/IP (transmission control protocol/Internet protocol) and the like.

In one embodiment, the Internet 112 is coupled to one or more content sources 116. A content source 116 provides access to various forms of content, such as web pages, streaming media, databases, commercial transactions, and the like. For example, a content source 116 may include a commercial e-commerce site, such as Amazon.com®. The content sources 116 may be accessed, for example, using a web browser integrated with an STB 102. Of course, content sources 116 may also be coupled directly to the network 101.

The system 100 is preferably capable of providing a variety of interactive options to a user. In one embodiment, an interactive option is a feature of the system 100 that allows a user to interact with a content source 116 while watching programming received from a programming source 114, accessing another content source 116, or the like.

For example, one interactive option may allow a user to participate in an opinion poll while watching a presidential debate. Another interactive option may allow a user to purchase an item being currently advertised or displayed. Still another interactive option may allow a user to check his or her e-mail in response to a notification that a new e-mail message has arrived. Yet another interactive option may allow a user to establish a two-way communication channel with a technical support person or a sales representative. The possible interactive options available using the system 100 are endless.

Interactive options may be implemented using various techniques, protocols, and standards. For example, one technique, established by the Advanced Television Enhancement Forum (ATVEF), relies on embedding "triggers" into a television broadcast. Triggers allow content developers, broadcasters, or cable operators to insert real-time prompts and user-selectable links into the video stream. Among other information, a trigger may contain a network address, such as a Universal Resource Locator (URL), that defines the location of content for the interactive option.

Figure 2:
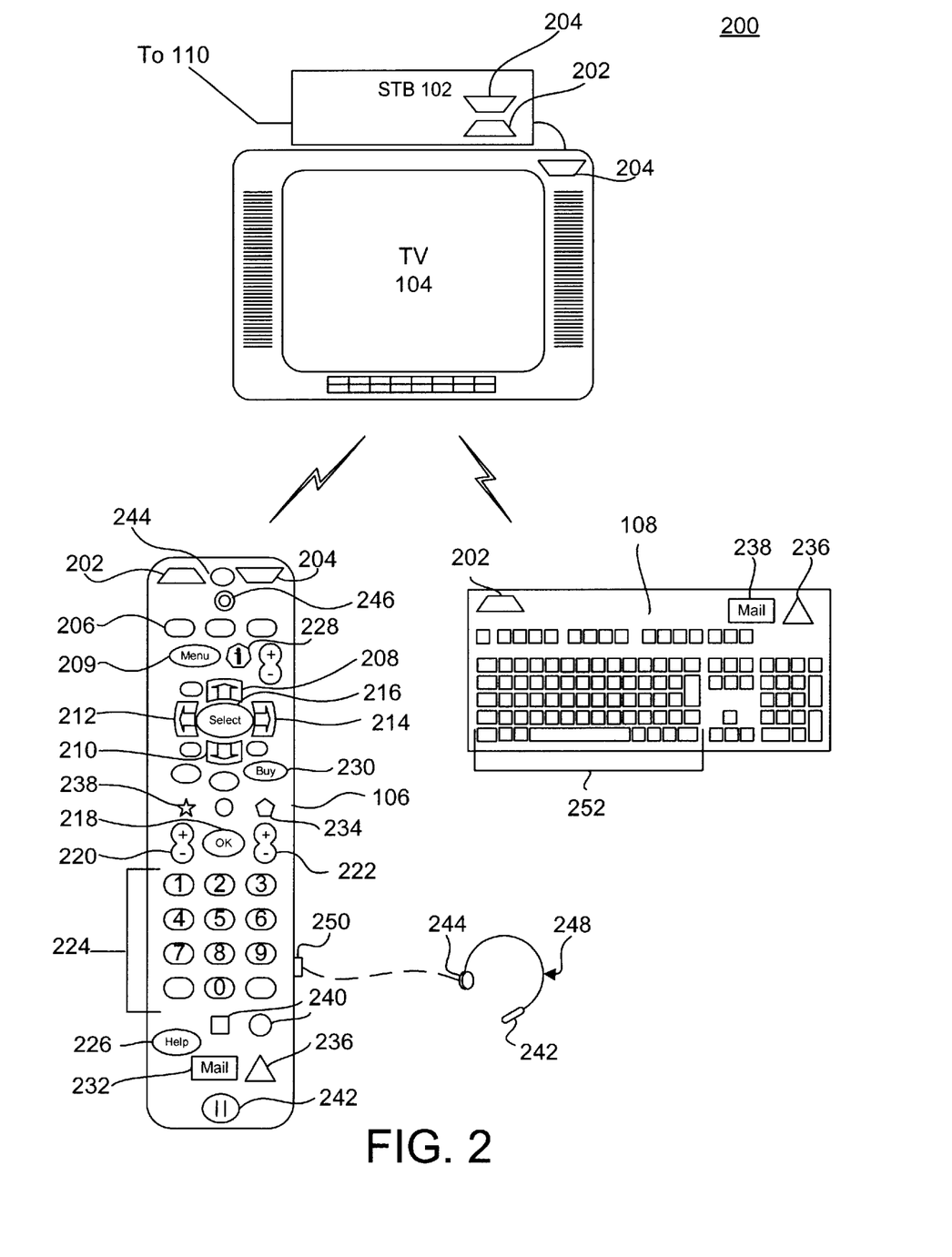
FIG. 2 is an illustration of an interactive television system including a remote control, a keyboard, a set top box, and a television.

Referring now to FIG. 2, there is shown an interactive television system 200 according to an embodiment of the invention. As depicted, the system 200 may include an STB 102, a television 104 (or other display device), a remote control 106, and, in certain configurations, a keyboard 108.

The remote control 106 is provided for convenient remote operation of the STB 102 and the television 104. In one configuration, the remote control 106 includes a wireless transmitter 202 for transmitting signals to the STB 102 and the television 104. Likewise, the remote control 106 includes a wireless receiver 204 for receiving signals from the STB 102.

In one embodiment, the wireless transmitters 202 and receivers 204 are configured to use radio frequency (RF)

signals. In other embodiments, infrared (IR) or other frequencies along the electromagnetic spectrum may be used. Operational details regarding the wireless transmitters 202 and receivers 204 are generally well known to those of skill in the art.

The remote control 106 preferably includes a number of buttons or other similar controls. For instance, the remote control 106 may include various standard buttons, such as a power button 206, an up arrow button 208, a down arrow button 210, a left arrow button 212, a right arrow button 214, a "Select" button 216, an "OK" button 218, channel adjustment buttons 220, volume adjustment buttons 222, alphanumeric buttons 224, and the like.

Additionally, the remote control 106, in one configuration, may includes a number of buttons specifically-designated for activating various interactive options. These buttons may include, for example, a "Help" button 226, an information button 228, a "Buy" button 230, an e-mail button 232, as well as other buttons 234, 236, 238, 240 designated to activate specific interactive options.

In one embodiment, the remote control 106 includes a microphone 242 for capturing an audio signal. The captured audio signal is preferably transmitted to the STB 102 via the wireless transmitter 202. In addition, the remote control 106 may include a speaker 244 for generating audible output from an audio signal received from the STB 102 via the wireless receiver 204.

The various components of the remote control 106 may be positioned in different locations for functionality and ergonomics. For example, as shown in FIG. 2, the speaker 244 may be positioned near the "top" of the remote control 106 (when viewed from the perspective of FIG. 2) and the microphone 242 may be positioned at the "bottom" of the remote control 106. Thus, in one embodiment, a user may conveniently position the speaker 244 near the user's ear and the microphone 242 near the user's mouth in order to operate the remote control 106 in the manner of a telephone. In alternative embodiments, as described below, the speaker 244, the microphone 242, and/or the video camera 246 may be disposed within the STB 102, the keyboard 108, the television 104, and/or other suitable locations.

Alternatively, or in addition, a hands-free headset 248 may be coupled to the remote control 106 or keyboard 108. The headset 248 may be coupled using a standard headset jack 250. The headset 248 may include a microphone 242 and/or speaker 244. Such a headset 248 may be used to reduce audio interference from the television 104 (improving audio quality) and to provide the convenience of hands-free operation.

In certain embodiments, the remote control 106 includes a video camera 246, such as a CCD (charge-coupled device) digital video camera. The video camera 246 allows a user to capture and send video signals to the STB 102. For example, the video camera 246 may capture images of a customer's screen to aid a support technician in resolving the customer's problem. In one implementation, the video camera 246 is in electrical communication with the wireless transmitter 202 for sending the captured video signal to the STB 102. Various techniques for encoding and transmitting video signals may be used that are well known to those skilled in the art.

The optional keyboard 108 facilitates rapid composition of text messages. The keyboard 108 includes a plurality of standard alphanumeric keys 252 arranged in a suitable format, such as "QUERTY" or "DVORAC". In one configuration, the keyboard 108 includes a wireless transmitter 202, similar or identical to the wireless transmitter 202 of the remote control 106. The wireless transmitter 202 transmits keystroke data from the keyboard 108 to the STB 102. Additionally, the keyboard 108 may include one or more of the buttons illustrated on the remote control 106.

In one implementation, the buttons and audio/video components of the remote control 106 are in electrical communication with the wireless transmitter 202 and/or the wireless receiver 204 for communicating with the corresponding wireless receiver 204 and/or wireless transmitter 202 within the STB 102. Such communication may be according to the IEEE 802.11a or 802.11b Wireless Networking standards, the "Bluetooth" standard, or according to other standard or proprietary wireless techniques. The wireless transmitter 202 and wireless receiver 204 may include various additional components not specifically illustrated but well known in the art.

Figure 3:
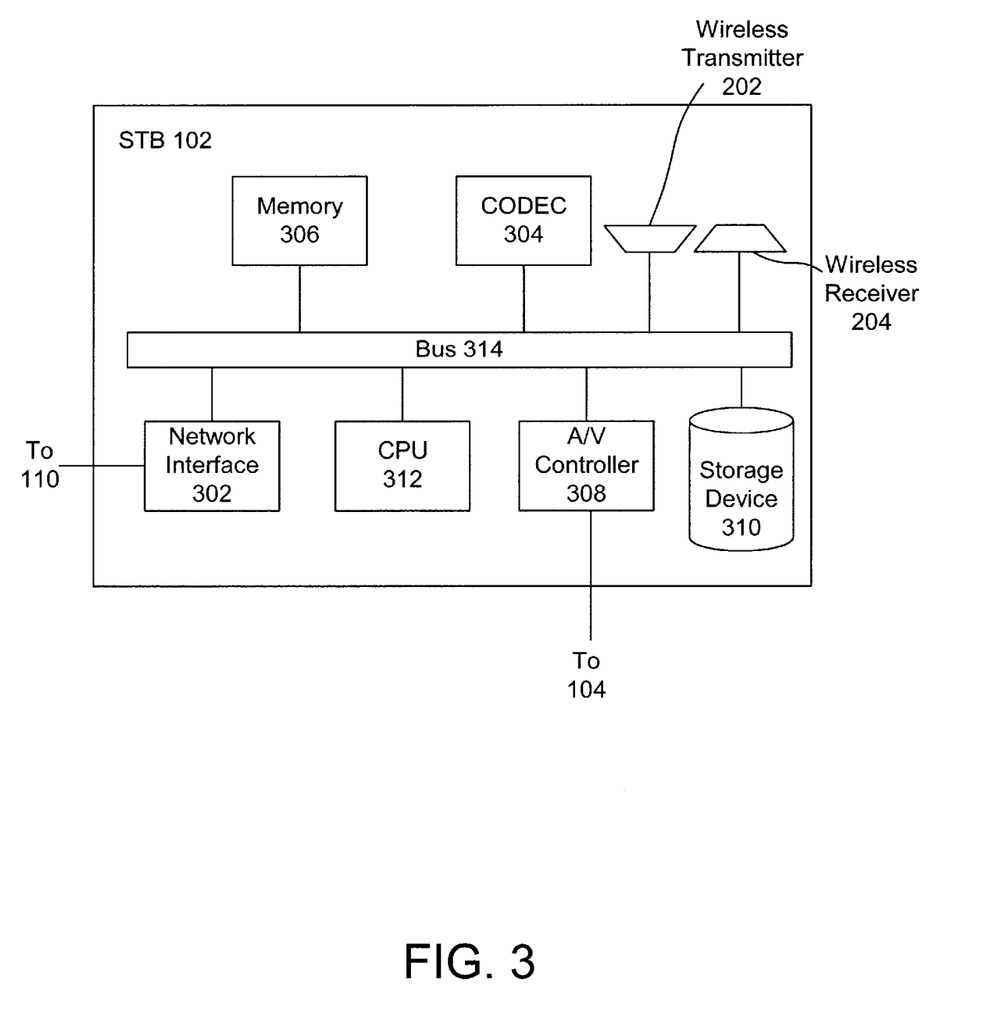
FIG. 3 is a physical block diagram of hardware components of a set top box.

Referring now to FIG. 3, there is shown a physical block diagram of an STB 102 according to an embodiment of the invention. As noted above, the STB 102 includes a wireless receiver 204 for receiving control signals and audio/video signals sent by the wireless transmitter 202 in the remote control 106.

The STB 102 also includes, in one implementation, a network interface 302 for communicating with the broadband communication network 101 via the head-end 110. The interface 302 may include conventional tuning circuitry for receiving MPEG (Moving Picture Experts Group) packets for a selected television channel. The interface 302 may also include conventional cable modem circuitry for sending or receiving other types of data. For example, the interface 302 may conform to the DOCSIS (Data Over Cable Service Interface Specification) or DAVIC (Digital Audio-Visual Council) cable modem standards. In one embodiment, a CMTS-DRFI (Cable Modem Termination System-Downstream RF Interface) may be used in conjunction with a CMTS-URFI (Cable Modem Termination System-Downstream RF Interface) to establish two-way communication between the STB 102 and the head-end 110.

In one configuration, one or more frequency bands (for example, from 5 to 30 MHz) may be reserved for upstream transmission. Digital modulation (for example, quadrature amplitude modulation or vestigial sideband modulation) may be used to send digital signals in the upstream transmission. Of course, upstream transmission may be accomplished differently for different networks 101. Alternative ways to accomplish upstream transmission include using a back channel transmission, which is typically sent via an analog telephone line, ISDN, DSL, or other techniques.

The STB 102 also preferably includes a CODEC (encoder/decoder) 304. The CODEC 304 serves to encode signals (such as audio/video signals) into a network-compatible data stream for transmission over the network 101. The CODEC 304 also serves to decode a network-compatible data stream received from the network 101. As depicted, the CODEC 304 may be implemented as a hardware component. Alternatively, or in addition, software encoding and decoding may be used. The CODEC 304 may use various algorithms, such as MPEG, for encoding and decoding.

The STB 102 further includes a memory device 306, such as a random access memory (RAM), configured to store data for temporary use. Similarly, a read-only memory (ROM) may be provided for storing more permanent data, such as fixed code and configuration information.

In one embodiment, an audio/video (A/V) controller 308 is provided for converting decoded digital audio/video information into analog signals for display/playback on the television 104 or other devices. The A/V controller 308 may be implemented using one or more physical devices, such as a separate graphics and audio interfaces. In alternative embodiments, the A/V controller 308 may provide a direct, digital video output for televisions 104 or other devices equipped to receive the same. Preferably, the A/V controller 308 includes graphics hardware for performing bit-block transfers (bit-blits) and other graphical operations. Additionally, the A/V controller 308 preferably includes hardware components for generating voice synthesized sounds from digital or analog input signals.

In some implementations, the STB 102 may include a storage device 310, such as a hard disk drive or the like. The storage device 310 may be configured to record encoded television broadcasts and retrieve the broadcasts at a later time for decoding by the CODEC 304 and display by the A/V controller 308.

The storage device 310 may also be used in various embodiments to store viewer preferences, parental lock settings, electronic programming guide (EPG) data, programming preferences, passwords, e-mail messages, and the like. In one implementation, the storage device 310 also stores an operating system (OS) for the STB 102, such as Windows CE® or Linux®.

A CPU 312 controls the operation of the STB 102, including the other components thereof, which are coupled to the CPU 312 via a bus 314. The CPU 312 may be embodied as a microprocessor, a microcontroller, a digital signal processor (DSP) or other device known in the art. As noted above, the CPU 312 may perform logical and arithmetic operations based upon control signals generated by the remote control 106 and transmitted to the receiver 204.

Of course, FIG. 3 illustrates only one possible configuration of an STB 102. Those skilled in the art will recognize that various other architectures and components may be provided within the scope of the invention. In addition, various standard components of typical STB 102 are not illustrated in order to avoid obscuring aspects of the invention.

As depicted in FIG. 2, the buttons and other controls on the remote control 106 and/or keyboard 108 can be highly complicated and overwhelming, particularly to a novice user. Often, simply finding the correct button for executing a command or accessing an interactive option may be a challenge. The problem is compounded by the fact that text markings on buttons of the remote control 106 may be in a language other than the user's primary language.

Conventionally, the challenge may be handled by including fewer buttons on the remote control 106, or by using translation stickers affixed to the buttons. However, fewer buttons requires various buttons to serve multiple roles, which can be annoying to advanced users. Also, translation stickers may fall off or require frequent changing. Alternatively, help screens and printed manuals may be provided to assist foreign language users. However, for certain interactive options, a user may not have time to consult a help screen or printed manual before the option is no longer available. The limited availability is even more troublesome when a user experiences a language barrier.

Figure 4:
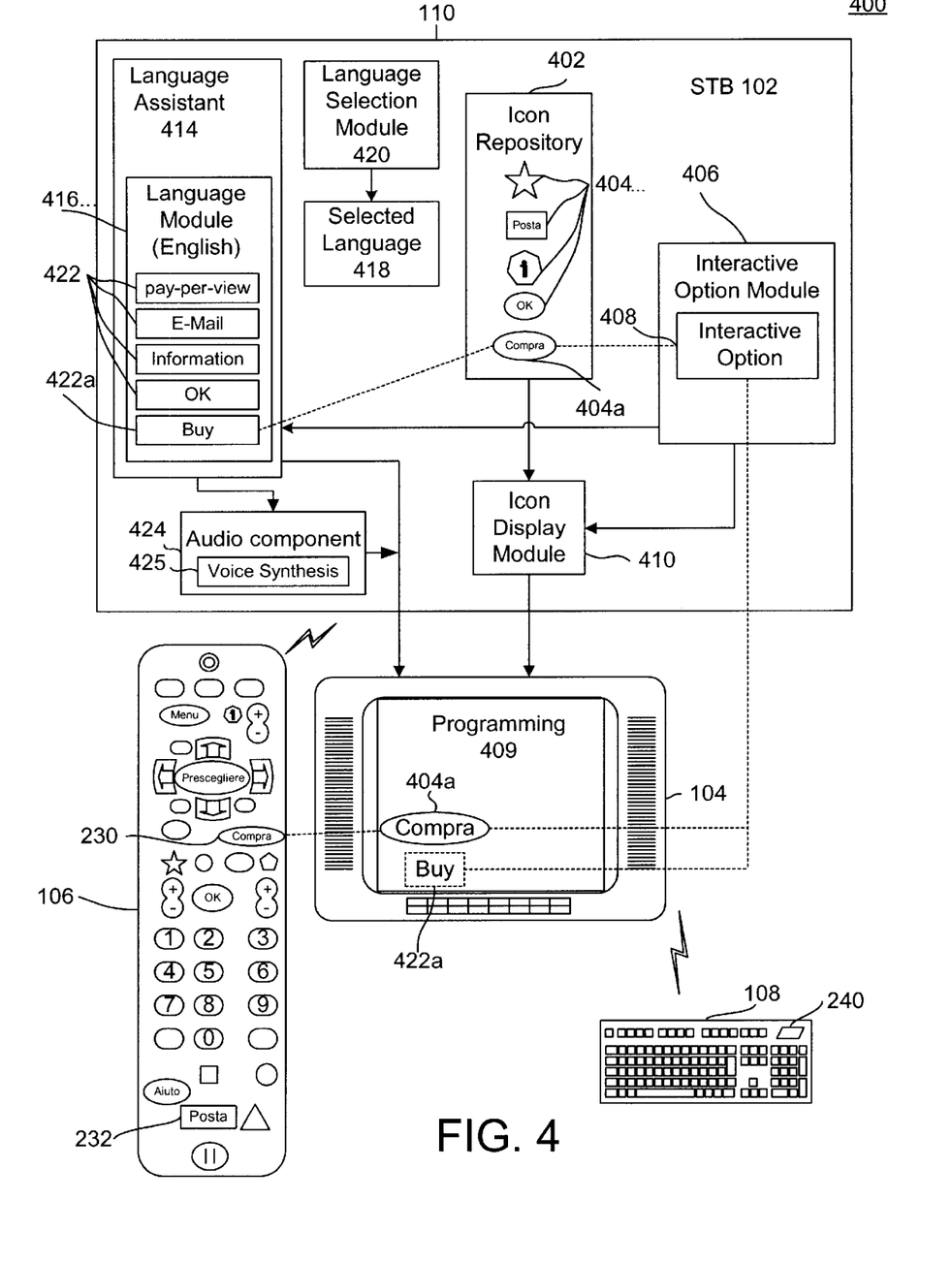
FIG. 4 is a logical block diagram of a system for assisting a speaker of a first language in operating a remote control device designed for a speaker of a second language.

FIG. 4 is a logical block diagram of a system 400 for assisting a speaker of a first language in operating a remote control device designed for a speaker of a second language that resolves the above-described problems and disadvantages of conventional approaches. As explained more fully hereafter, the depicted system 400 provides an intuitive mechanism for instructing a speaker of a first language how to use a remote control 106 including printed text in a foreign language. The depicted logical components may be implemented using one or more of the physical components shown in FIG. 3. Additionally, or in the alternative, various logical components may be implemented as software modules stored in the memory 306 and/or storage device 310 and executed by the CPU 312.

In one embodiment, the system 400 includes an icon repository 402 for storing a plurality of icons 404. An icon is a small picture that typically represents an object or program within a GUI.

In the context of the following description, an icon 404 represents a button on the remote control 106 and shares one or more visual characteristics with the button it represents. For example, the icon 404 may have the same shape as the corresponding button. Likewise, the icon 404 may be the same color. Furthermore, the icon 404 and the corresponding button may share similar graphical or textual markings. For example, as shown in FIG. 4, a text marking "Compra", indicating "Buy" in Italian, may be used on an icon 404a corresponding to the buy button 230.

In one embodiment, the icon 404 and the corresponding button may share multiple visual characteristics, such as both shape and color, or shape and text markings. The correlation of multiple visual characteristics can be a powerful visual cue to a user in locating the correct button on the remote control 106.

Icons 404 in the repository 402 may be stored in various standard formats, such as bitmaps, JPEG (Joint Photographic Experts Group) images, GIF (Graphic Interchange Format) images, TIFF (Tagged Interchange File Format) images, etc. The icon repository 402 may be implemented using any suitable data structure, such as an array, linked list, stack, queue, disk file, or the like. The data structure implementing the icon repository 402 may be stored in the memory 306 or the storage device 310. The icon repository 402 may include an index (not shown) to provide faster storage and retrieval of icons 404 within the icon repository 402.

In one embodiment, one or more icons 404 may correspond to particular interactive options 408 that may be periodically available during the presentation of television programming 409 or other forms of content (such as web pages, user interfaces, or the like) on the television 104. Each interactive option 408 may be facilitated by one or more interactive option modules 406 configured to provide the appropriate functionality.

In one configuration, an interactive option module 406 detects the availability of the interactive option 408. This may be accomplished, in one embodiment, by detecting a trigger received with the television programming 409. For example, the interactive option module 406 may detect an ATVEF trigger containing a link to an advertiser's site.

The system 400 may also include an icon display module 410, which is in communication with the interactive option module 406. After the interactive option module 406 detects that the interactive option 408 is available, the icon display module 410 instructs the user as to which button of the remote control 106 should be pressed to activate the option 408. In one configuration, the icon display module 410 retrieves an icon 404 corresponding to the option 408 from the icon repository 402 and displays the icon 404 on the television 104 (or other display device).

The system 400 may also include a language assistant 414, which is in communication with the interactive option module 406. In one embodiment, the language assistant 414 includes, or is in communication with, one or more language modules 416. A language module 416 may be embodied as a collection of descriptions 422, in a particular language, of interactive options 408 and corresponding icons 404 in the icon repository 402. A description 422 may include a translation of text found on the corresponding icon 404 or button on the remote control 106, although this is not a requirement. For example, descriptions 422 may be provided where an icon 404 or button does not include text.

Those of skill in the art will recognize that a single language module 416 may store descriptions 422 in a plurality of languages. Alternatively, a separate language module 416 may be used to store descriptions 422 for each language.

In certain embodiments, a language module 416 may be implemented as a data structure that is loaded into memory 306 of the STB 102. Alternatively, one or more language modules 416 may be accessible at the head-end 110 or at various other locations in the network 101 or Internet 112.

In one embodiment, a user may specify a selected language 418 by means of a language selection module 420. The language selection module 420 may be implemented using any conventional user interface technique. For instance, a user may select from a menu (not shown) of possible languages. The selected language 418 may be the same as, or different than, the language associated with the remote control 106.

If the selected language 418 is different than that of the remote control 106, when an icon 404 is displayed in response to the availability of an interactive option 408, the language assistant 414 presents the corresponding description 422 in the selected language 418. The description 422 assists the user who speaks the selected language 418 in understanding what interactive option 408 is available by pressing the button of the remote control 106 indicated by the icon 404. As noted, descriptions 422 may include a translation of text markings that appear on the icon 404 or the button on the remote control 106.

In one configuration, the language assistant 414 retrieves the description 422 from the appropriate language module 416 and displays the description 422 on the television 104 (or other display device) in close proximity to the icon 404. The icon 404 and description 422 may be superimposed over the displayed programming 409 using a semitransparent graphical overlay. This prevents the icon 404 and/or description 422 from obscuring the programming 409. The icon display module 410 and language assistant 414 may include, or be in communication with, the A/V controller 308 of FIG. 3 in order to combine the display of the icon 404 and description 422 with the programming 409 using conventional techniques.

Displaying the icon 404 both notifies the user as to the availability of the interactive option 408 and instructs the user concerning the appearance (and possibly the location) of the corresponding button on the remote control 106. Hence, the icon 404 is sometimes referred to herein as an "instructional" icon for a user interface.

Displaying the description 422 provides meaning for the icon 404 to a user who speaks a language other than the language for which the remote control 106 was designed. Consequently, the user may desire to locate the button on the remote control 106 and activate the available option 408. Without the description 422, the icon 404 will be of little assistance to, and may actually annoy, a user who speaks a different language.

In addition, in certain embodiments, the description 422 conveys the meaning intended by text markings on an icon 404. When a description 422 provides a translation of text markings on an icon 404, the text markings of the icon 404 serve the foreign language user as graphical markings to assist in locating the corresponding button. For instance, Chinese text markings on a button displayed with a description 422 translating the text may provide effective visual cues to assist a user in locating the button on a Chinese remote control.

As an example, suppose the remote control 106 includes text markings in Italian, e.g. button 230 includes "Compra" in place of "Buy". When a particular product is displayed, the programming 409 may include a trigger for an interactive option 408 enabling a user to purchase the displayed product by pressing the "Compra" button 230.

However, suppose a user has specified English as the selected language 418. In one implementation, the icon display module 410 retrieves and displays the icon 404a from the icon repository 402 corresponding to the "Compra" button 230. At essentially the same time, the language assistant 414 retrieves the corresponding description 422a, e.g. "Buy", corresponding to the icon 404a from the English language module 416. In one embodiment, the language assistant 414 displays the description 422a on the television 104 in close proximity to the icon 404a. Broken lines in FIG. 4 indicate the relationship between the "Compra" button 230, the interactive option 408, the icon 404a and the description 422a.

As shown in FIG. 4, the icon 404a has the same shape as the "Compra" button 230, e.g. a squashed oval. Moreover, both the icon 404a and the "Compra" button 230 include similar text markings, e.g. the word "Compra." Furthermore, the description 422a provides a direct translation of the Italian word "Compra" into its English equivalent, "Buy." The similarity of the shape and textual markings of the icon 404a with the translation provided by the description 422a may assist the user in rapidly locating the "Compra" button 230 on the remote control 106. Additionally, the description 422a assists the user in deciding whether activating the "Buy" interactive option 408 is desirable.

In an alternative embodiment, the system 400 may include an audio component 424 in communication with the language assistant 414. As described in greater detail below, the audio component 424 allows the language assistant 414 to present audible descriptions 422 (in a user-preferred language) in addition to, or in lieu of, visual descriptions 422. For example, the audio component 424 may use a voice synthesis module 425 to output a spoken version of a description 422. Various text-to-speech voice synthesis systems are available from Lucent®, Creative Labs®, and others.

While the icon repository 402, the icon display module 410, the interactive option module 406, the audio component 424, and the language assistant 414 are illustrated as components of the STB 102, those skilled in the art will recognize that these components may be located within various physical locations within the system 100. For example, a single icon repository 402 may be implemented within a head-end 110 and provide icons 404 to a plurality of STBs 102. Additionally, a language assistant 414 may reside on a server (not shown) connected to the Internet 112.

Figure 5:
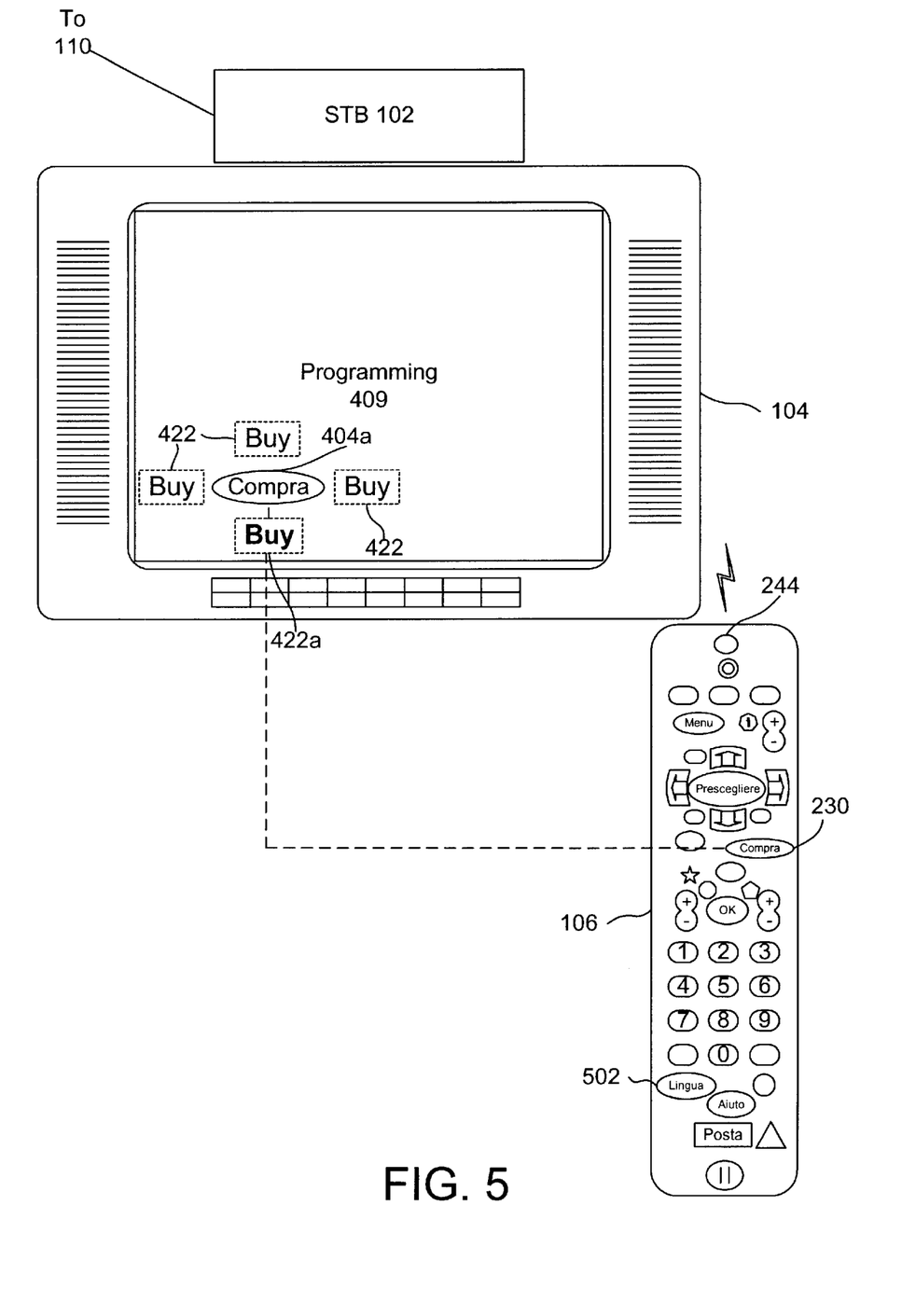
FIG. 5 illustrates an icon with a corresponding description in a user-preferred language.

In one embodiment, the language assistant 414 is configured to display the description 422 at various locations on the television 104 in relation to the icon 404. As shown in FIG. 5, the description 422 may be displayed above, below, to the left, or to the right of the icon 404. In one configuration, the language assistant 414 may actually replace text markings on the icon 404 with a translated description 422.

In certain configurations, the description 422 may be visually emphasized by highlighting, illuminating, pulsing, or otherwise emphasizing the description 422. In the depicted embodiment, description 422a is bolded to attract the user's attention. Visual emphasis may also be accomplished, for example, by cycling colors of the description 422a, changing the color of the display screen behind the description 422a, or other similar techniques.

As also shown in FIG. 5, the displayed description 422a may be larger than the text markings of the icon 404. This may be helpful to users who have impaired vision. Typically, at least some enlargement of text markings is necessary, since the low resolution of a television screen makes small text and graphics difficult to understand.

FIG. 5 also shows a language button 502, e.g. "Lingua" in Italian. In certain embodiments, the language button 502 may be used to change the selected language 418 discussed in relation to FIG. 4. In this manner, a foreign language user may quickly set the selected language 418 and receive descriptions 422 in the user's preferred language.

In one embodiment, when a user activates a button corresponding to a displayed icon 404, the system 400 produces an audible confirmation. The audible confirmation may be used to assure the user that the correct button was pressed on the remote control 106. The AN controller 308 of FIG. 3 may be configured to produce an audio signal when the correct button is activated. The audio signal may include, for example, a chime, a tone, a beep, or other suitable indicator. In one embodiment, the audio signal may include a spoken name of the button, in the selected language 418, which may be generated using conventional voice synthesis techniques.

Figure 6:
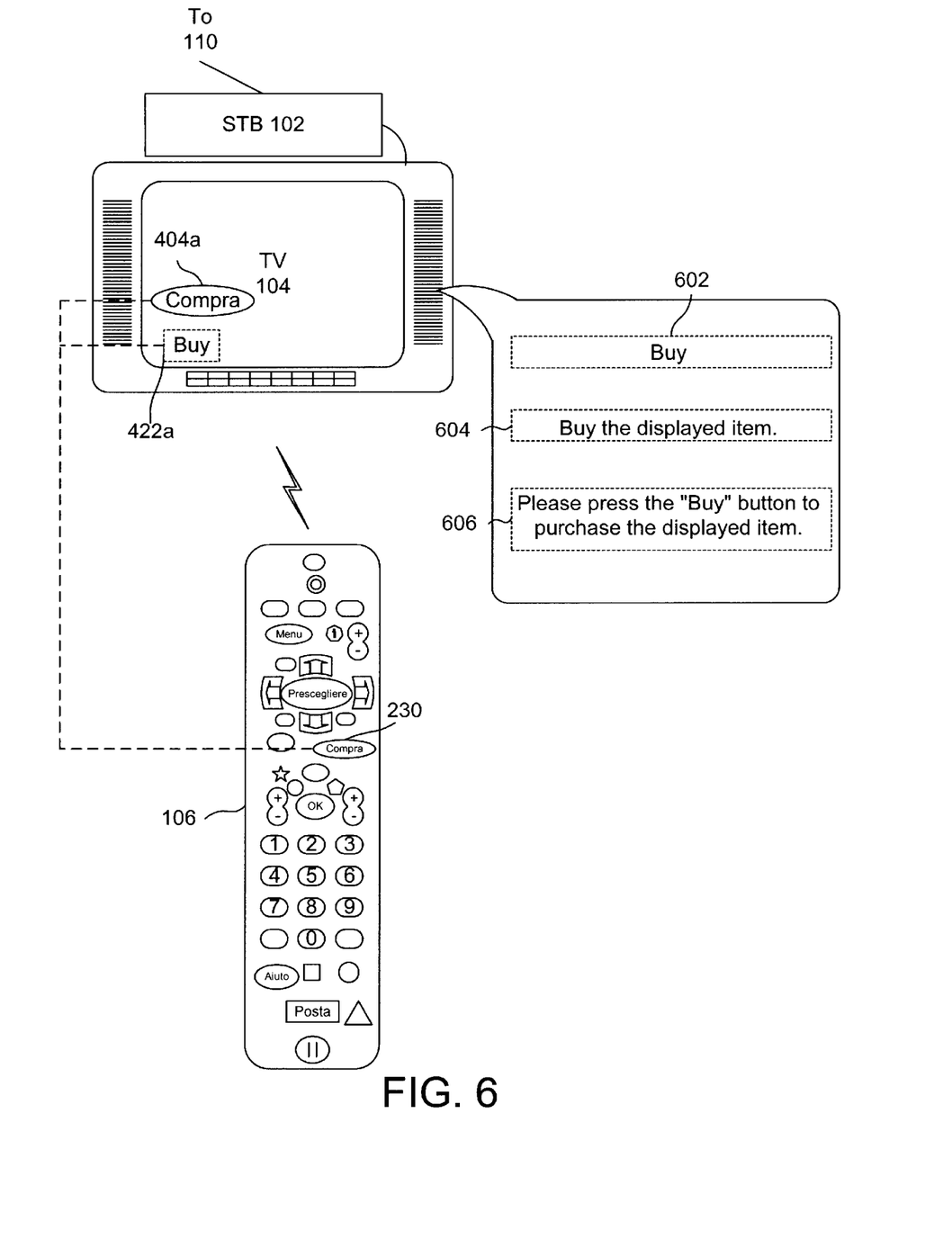
FIG. 6 illustrates a technique for providing a visual and/or audible prompt.

FIG. 6 illustrates an alternative embodiment of the invention in which a description 422a is presented both visually and audibly. The description 422a may include alternative audible messages 602, 604, 606 to assist the speaker of a language other than the default language of the remote control 106. These messages 602, 604, 606 may be played on a speaker associated with the television 104, the STB 102, or another suitable location.

The system 400 may be configured to provide a word message 602, e.g. "Buy", a phrase message 604, e.g., "Buy the displayed item," or an instructional message 606, e.g., "Please press the "Buy" button to purchase the displayed item." The instructional message 606 may be particularly useful, in that it may provide step-by-step instructions, in the user's preferred language, concerning the operation of the remote control 106.

Figure 7:
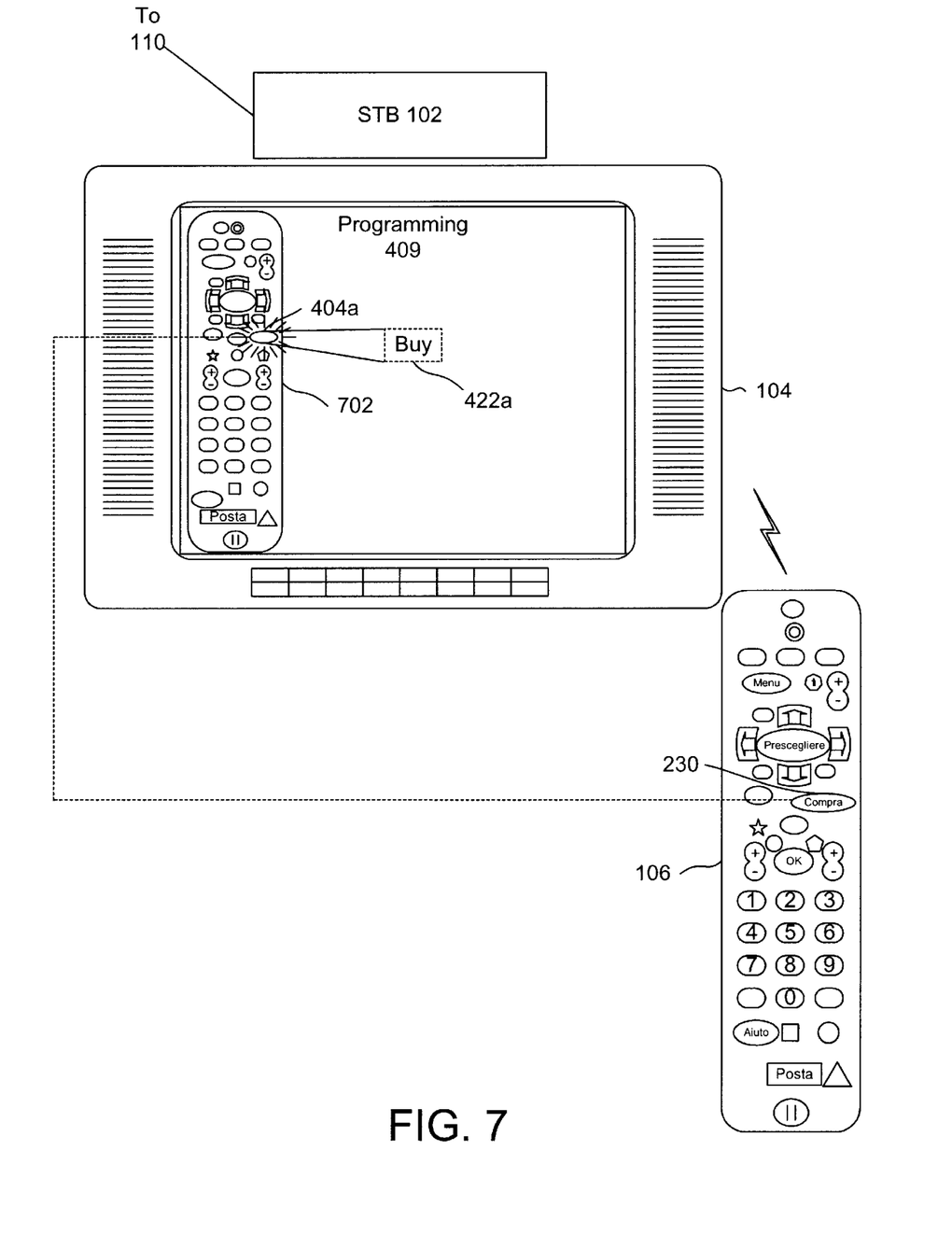
FIG. 7 illustrates a map of a remote control being displayed on a display device.

In some embodiments, a map 702 of the remote control 106 (or a portion thereof) is displayed in order to help the user locate a particular button, as illustrated in FIG. 7. The map 702 may include a plurality of icons 404 from the repository 402, which are arranged according to the relative locations of the corresponding buttons on the remote control 106. The map 702 may include other graphical elements, such as a semitransparent outline of a remote control to provide a context for the displayed icons 404. In addition, the map 702 may contain icons 404 corresponding to buttons that are not used for interactive options 408, such as, for example, the power button 206. In one embodiment, the map 702 is displayed by the icon display module 410.

An icon 404a corresponding to a currently available interactive option 408 may be visually emphasized within the map 702 through highlighting, animation, scaling, or the like. This allows the user to rapidly determine the location of the corresponding button within the remote control 106.

Moreover, the description 422a of the interactive option 408 may be displayed in connection with the icon 404a, as previously described. The description 422a, likewise, may be visually emphasized using the techniques discussed above to bring the same to the attention of the user. For example, as shown in FIG. 7, the description 422a associated with the icon 404a corresponding to the "Compra" button 230 may be cyclically scaled (e.g., enlarged and reduced) in an animated fashion to attract the user's attention. Alternatively, the description 422a may be rotated, translated, or the like. Of course, the illustrated animation is merely exemplary, and many other techniques for animation may be used.

The size and location of each icon 404a within the map 702 is preferably relative to the size and location of the corresponding button of the remote control 106. Thus, to locate a button of the remote control 106, a user may compare the size and location of a displayed icon 404a corresponding to an available interactive option 408 with the size and location of corresponding buttons of the remote control 106.

Of course, the map 702 need not correspond to the entire remote control 106. For example, the map 702 may represent only the "top" or "bottom" halves of the remote control 106, or some other discrete portion thereof.

Figure 8:
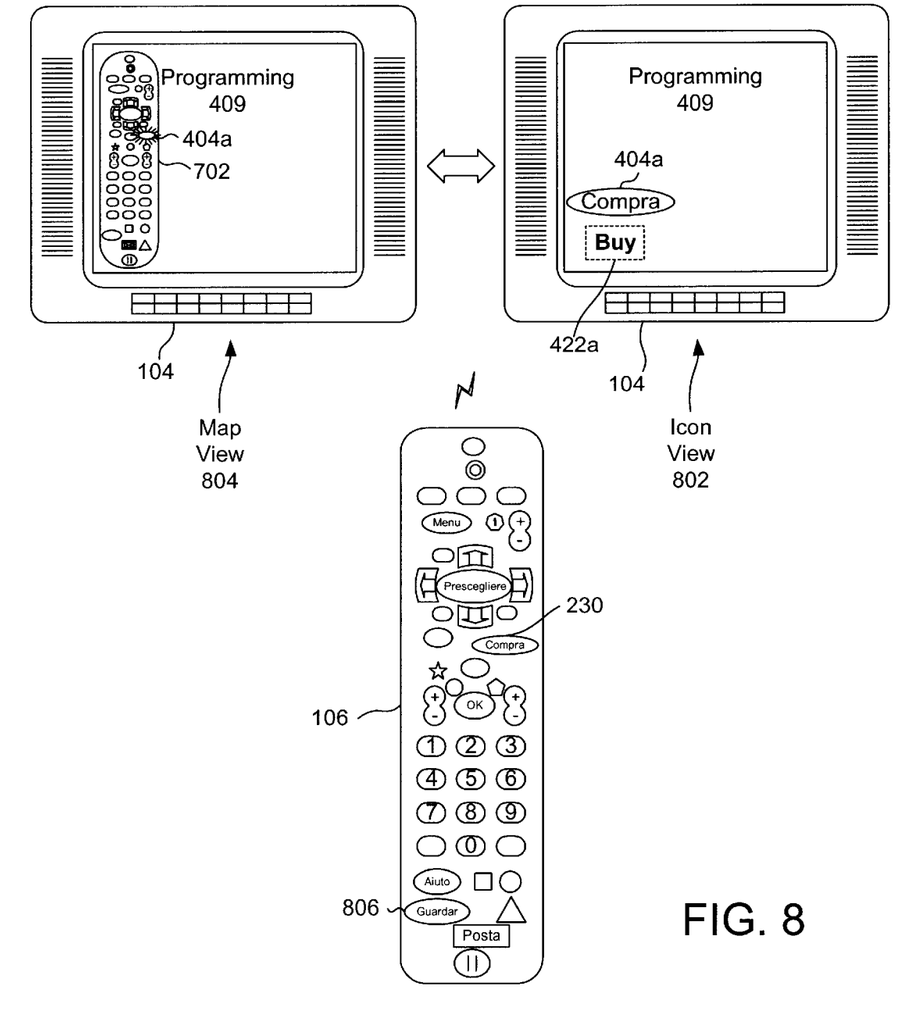
FIG. 8 illustrates user-selectable map views and icon views.

In one embodiment, as shown in FIG. 8, a user may switch between an icon view 802 and a map view 804. The icon view 802 may correspond to the embodiments shown in FIGS. 4–6 in which an icon 404 representing an available interactive option 408 is displayed with a description 422. The map view 804 may correspond to the embodiment depicted in FIG. 7 in which a map 702 is displayed.

In one embodiment, the icon view 802 may be the default view, with the map view 804 being displayed only in response to a user pressing an appropriate button on the remote control 106, such as a "View" button 806. For remote controls 106 designed for specific languages the "View" button 806 may include text markings in a default language such as Italian, e.g. "Guardar." A speaker of a language other than the default language may learn the function of the "Guardar" button 806 through minimal assistance, translated manuals, or on-line help. Alternatively, the map view 804 may be the default view. The "View" button 806 may be configured to toggle the display between the icon view 802 and the map view 804 in various embodiments.

Figure 9:
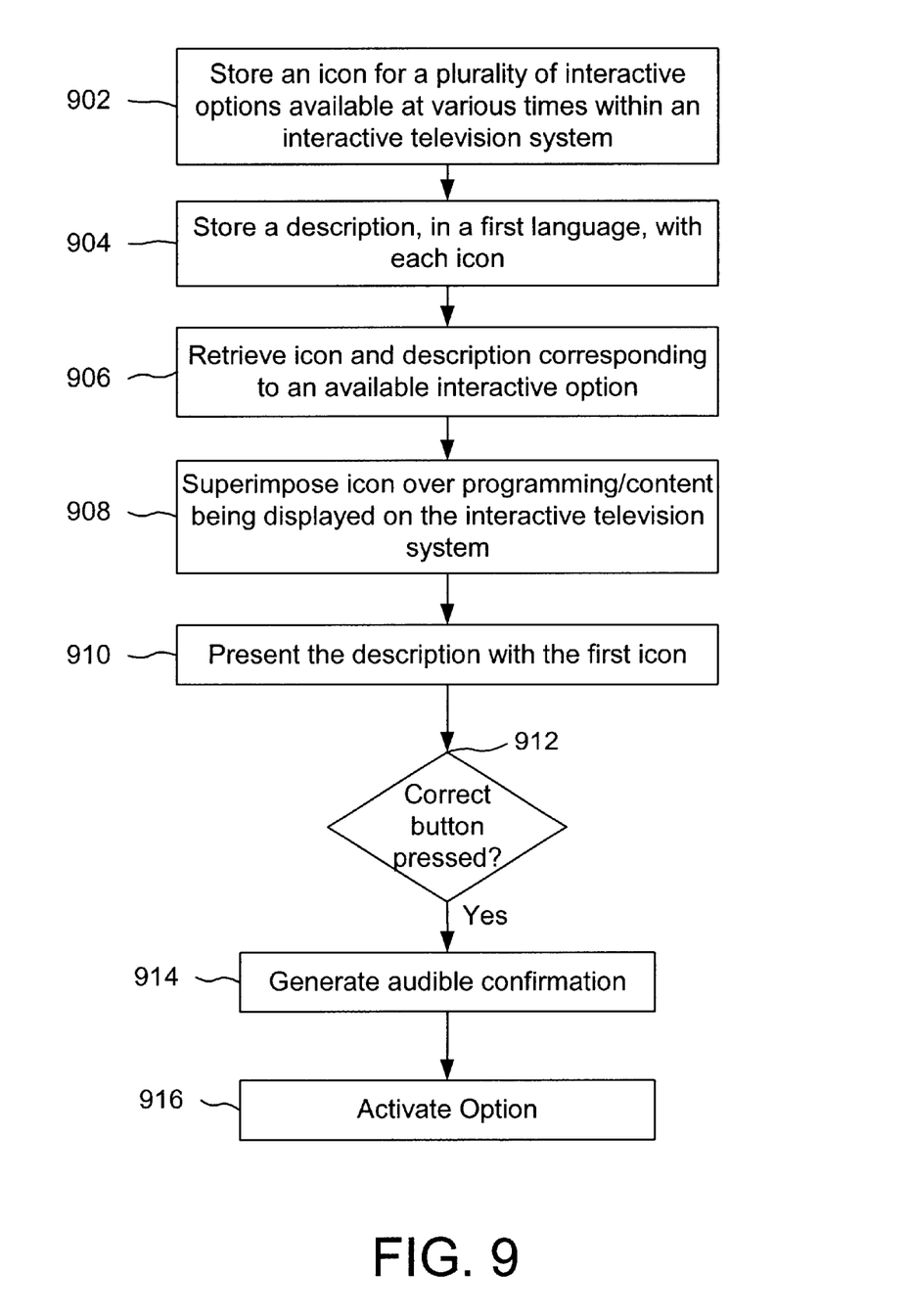
FIG. 9 is a flowchart of a method for assisting a speaker of a first language in operating a remote control device designed for a speaker of a second language.

Referring now to FIG. 9, there is shown a flowchart of a method 900 for assisting a speaker of a first language in operating a remote control device 106 designed for a speaker of a second language. The method 900 begins by storing 902 in a repository 402 an icon 404 for each of a plurality of interactive options 408 available at various times within a system 400. In addition, a description 422, in the first language, is stored 904 with each icon 404 describing the corresponding interactive option 408.

When an interactive option 408 becomes available, an icon 404 corresponding to the interactive option 408 is retrieved 906 from the repository 402. In addition, a language assistant 414 retrieves a corresponding description 422 from a language module 416 corresponding to the preferred language of the user. Thereafter, the icon 404 is superimposed 908, in one embodiment, over currently-displayed programming 409 or other displayed content. Next, the description 422 is presented 910, in one embodiment, by displaying the description 422 in close proximity to the icon 404. Additionally, an audible message 602, 604, 606 may be presented to the user via conventional voice synthesis techniques.

As noted previously, a user may switch between a map view 804 and an icon view 802 of the icon 404 and description 422 by pressing an appropriate button, such as a "View" button 806. In certain configurations, the icon 404 and/or description 422 may be visually emphasized to attract the user's attention. Various types of visual emphasis are contemplated, such as highlighting, animation, scaling, etc.

A determination 912 is then made as to whether the user has selected the available interactive option 408 using the remote control 106, e.g. was the correct button pressed. If so, an audible confirmation is generated 914 to alert the user to the fact that the correct button was pressed. The interactive option 408 is then activated 916 using conventional techniques.

Based upon the foregoing, the present invention offers numerous advantages not available in conventional interactive television systems. In response to an interactive option becoming available, an instructional user interface icon is displayed to assist a user in identifying and/or locating a corresponding button on the remote control. In addition, a description accompanies the icon when the user speaks a language other than the default language of the remote control. The description provides meaning for the icon and may generate interest for activating the interactive option. Each icon shares a common visual characteristic with a corresponding button, such as shape, color, text markings, graphical markings, size, relative position, and the like. Accordingly, the user is not required to read a translated printed manual or an on-line help screen to make use of an interactive option.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for assisting a speaker of a first language in operating a remote control device designed for a speaker of a second language, the method comprising:
    storing an icon for each of a plurality of interactive options periodically available within an interactive television system, each interactive option corresponding to a button on the remote control device, each icon sharing a common visual characteristic with a button on the remote control device;
    storing with each icon a description, in the first language, of a corresponding interactive option;
    displaying an icon on a display device associated with the interactive television system in response to a corresponding interactive option becoming available; and
    presenting with the icon the description of the interactive option in the first language.

2. The method of claim 1, wherein the remote control device includes text markings in the second language, and wherein the description comprises a translation of the text markings into the first language.

3. The method of claim 1, wherein presenting comprises: displaying the description on the display device.

4. The method of claim 3, further comprising
    visually emphasizing the description on the display device.

5. The method of claim 4, wherein the description is visually emphasized using a technique selected from the group consisting of highlighting, animation, and scaling.

6. The method of claim 1, wherein presenting comprises:
    displaying the description on the display device in proximity to the icon.

7. The method of claim 6, wherein the description is displayed in a location selected from the group consisting of above the icon, below the icon, to the left of the icon, and to the right of the icon.

8. The method of claim 6, wherein the description is displayed on the icon.

9. The method of claim 1, wherein presenting comprises:
    outputting the description using a voice synthesis technique on a speaker associated with the interactive television system.

10. The method of claim 1, further comprising:
    audibly instructing a user, in the first language, to activate the button associated with the icon.

11. The method of claim 1, wherein at least one shared visual characteristic is selected from the group consisting of color, shape, text markings, graphical markings, relative size, and relative position.

12. The method of claim 1, wherein at least one icon shares a plurality of visual characteristics in common with a corresponding button on the remote control.

13. The method of claim 1, further comprising:
    displaying a map of the remote control device including the displayed icon, wherein the map comprises a plurality of icons representing buttons, each icon having a same relative location as a corresponding button on the remote control.

14. The method of claim 13, further comprising:
    switching between a view of the displayed icon and a view of the map in response to a user command.

15. The method of claim 1, further comprising:
    producing an audible confirmation in response to a user activating the corresponding button.

16. A system for assisting a speaker of a first language in operating a remote control designed for a speaker of a second language, the system comprising:
    an icon repository configured to store an icon for each of a plurality of interactive options periodically available within an interactive television system, each interactive option corresponding to a button on the remote control device, each icon sharing a common visual characteristic with a button on the remote control device;
    a language module configured to store a description, in the first language, of a corresponding interactive option associated with each icon;
    an icon display component configured to display an icon on a display device associated with the interactive television system in response to a corresponding interactive option becoming available; and
    a language assistant configured to present with the icon a description of the interactive option in the first language.

17. The system of claim 16, wherein the remote control device includes text markings in the second language, and wherein the description comprises a translation of the text markings into the first language.

18. The system of claim 16, wherein the language assistant is further configured to display the description on the display device.

19. The system of claim 18, wherein the language assistant is further configured to visually emphasize the description on the display device.

20. The system of claim 19, wherein the description is visually emphasized using a technique selected from the group consisting of highlighting, animation, and scaling.

21. The system of claim 16, wherein the language assistant is further configured to display the description on the display device in proximity to the icon.

22. The system of claim 21, wherein the description is displayed in a location selected from the group consisting of above the icon, below the icon, to the left of the icon, and to the right of the icon.

23. The system of claim 21, wherein the description is displayed on the icon.

24. The system of claim 16, wherein the language assistant is further configured to output the description, using a voice synthesis technique, on a speaker associated with the interactive television system.

25. The system of claim 16, wherein the language assistant is further configured to audibly instruct a user, in the first language, to activate the button associated with the icon.

26. The system of claim 16, wherein at least one shared visual characteristic is selected from the group consisting of color, shape, text markings, graphical markings, relative size, and relative position.

27. The system of claim 16, wherein at least one icon shares a plurality of visual characteristics in common with a corresponding button on the remote control.

28. The system of claim 16, wherein the language assistant is further configured to display a map of the remote control device including the displayed icon, wherein the map comprises a plurality of icons representing buttons, each icon having a same relative location as a corresponding button on the remote control.

29. The system of claim 28, wherein the language assistant is further configured to switch between a view of the displayed icon and a view of the map in response to a user command.

30. The system of claim 16, further comprising:
an audio component configured to produce an audible confirmation in response to a user activating the corresponding button.

31. A computer program product for assisting a speaker of a first language in operating a remote control device designed for a speaker of a second language, the computer program product comprising:
program code for storing an icon for each of a plurality of interactive options periodically available within an interactive television system, each interactive option corresponding to a button on the remote control device, each icon sharing a common visual characteristic with a button on the remote control device;
program code for storing with each icon a description, in the first language, of a corresponding interactive option;
program code for displaying an icon on a display device associated with the interactive television system in response to a corresponding interactive option becoming available; and
program code for presenting with the icon the description of the interactive option in the first language.

32. The computer program product of claim 31, wherein the remote control device includes text markings in the second language, and wherein the description comprises a translation of the text markings into the first language.

33. The computer program product of claim 31, wherein the program code for presenting comprises:
program code for displaying the description on the display device.

34. The computer program product of claim 33, further comprising
program code for visually emphasizing the description on the display device.

35. The computer program product of claim 34, wherein the description is visually emphasized using a technique selected from the group consisting of highlighting, animation, and scaling.

36. The computer program product of claim 31, wherein the program code for presenting comprises:
program code for displaying the description on the display device in proximity to the icon.

37. The computer program product of claim 36, wherein the description is displayed in a location selected from the group consisting of above the icon, below the icon, to the left of the icon, and to the right of the icon.

38. The computer program product of claim 36, wherein the description is displayed on the icon.

39. The computer program product of claim 31, wherein the program code for presenting comprises:
program code for outputting the description, using a voice synthesis technique, on a speaker associated with the interactive television system.

40. The computer program product of claim 31, further comprising:
program code for audibly instructing a user, in the first language, to activate the button associated with the icon.

41. The computer program product of claim 31, wherein at least one shared visual characteristic is selected from the group consisting of color, shape, text markings, graphical markings, relative size, and relative position.

42. The computer program product of claim 31, wherein at least one icon shares a plurality of visual characteristics in common with a corresponding button on the remote control.

43. The computer program product of claim 31, further comprising:
program code for displaying a map of the remote control device including the displayed icon, wherein the map comprises a plurality of icons representing buttons, each icon having a same relative location as a corresponding button on the remote control.

44. The computer program product of claim 43, further comprising:
program code for switching between a view of the displayed icon and a view of the map in response to a user command.

45. The computer program product of claim 31, further comprising:
program code for producing an audible confirmation in response to a user activating the corresponding button.

46. A method for assisting a speaker of a first language in operating a remote control device designed for a speaker of a second language, the system comprising:
storing an icon for each of a plurality of interactive options periodically available within an interactive television system, each interactive option corresponding to a button on the remote control device, each icon sharing at least one common visual characteristic with a button on the remote control device, wherein the at least one shared visual characteristic is selected from the group consisting of color, shape, text markings, graphical markings, relative position, and relative size;

determining that an interactive option has become available within the interactive television system;

retrieving an icon corresponding to the available interactive option;

displaying the icon on a display device associated with the interactive television system;

presenting with the icon the description of the interactive option in the first language;

detecting that a user has pressed a button on the remote control corresponding to the available interactive option; and activating the available interactive option.

47. A system for assisting a speaker of a first language in operating a remote control device designed for a speaker of a second language, the method comprising:

an icon repository configured to store an icon for each of a plurality of interactive options periodically available within an interactive television system, each interactive option corresponding to a button on the remote control device, each icon sharing at least one common visual characteristic with a button on the remote control device, wherein the at least one shared visual characteristic is selected from the group consisting of color, shape, text markings, graphical markings, relative position, and relative size;

an interactive option module configured to determine that an interactive option has become available within the interactive television system;

an icon display module configured to retrieve an icon corresponding to the available interactive option and display the icon on a display device associated with the interactive television system;

a language assistant configured to present with the icon the description of the interactive option in the first language; and a wireless receiver configured to detect that a user has pressed a button on the remote control corresponding to the available interactive option;

wherein the interactive option module is further configured to activate the available interactive option in response to detecting that the user has pressed the corresponding button on the remote control.

48. A method for assisting a speaker of a first language in operating a remote control device designed for a speaker of a second language, the method comprising:

storing an icon for each of a plurality of interactive options periodically available within an interactive television system, each interactive option corresponding to a button on the remote control device, each icon sharing at least one common visual characteristic with a button on the remote control device;

determining that an interactive option has become available within the interactive television system;

retrieving a first icon corresponding to the available interactive option;

displaying a map of the remote control including the first icon, wherein the map comprises a plurality of other icons representing buttons, each icon having a same relative location as a corresponding button on the remote control;

visually emphasizing the first icon in the map relative to the plurality of icons;

presenting with the first icon the description of the interactive option in the first language;

detecting that a user has pressed a button on the remote control corresponding to the available interactive option; and activating the available interactive option.

* * * * *

UNITED STATES PATENT AND TRADEMARK OFFICE
CERTIFICATE OF CORRECTION

PATENT NO.    : 6,559,866 B2
DATED         : May 6, 2003
INVENTOR(S)   : Hubert E. Kolde, Kory D. Christensen and David J. McKenzie It is certified that error appears in the above-identified patent and that said Letters Patent is hereby corrected as shown below:

Column 7,
Lines 2, 5 and 17, "AN" should be -- A/V --.

Column 11,
Line 29, "AN" should be -- A/V --.

Signed and Sealed this

Eleventh Day of November, 2003

JAMES E. ROGAN
*Director of the United States Patent and Trademark Office*